United States Patent Office 2,953,474
Patented Sept. 20, 1960

2,953,474

MANUFACTURE OF ARTIFICIALLY COLORED GRANULES

Peyton Wheeler, Red Bank, N.J., assignor to Minerals and Chemicals Corporation of America, Menlo Park, N.J., a corporation of Maryland No Drawing. Filed Mar. 4, 1958, Ser. No. 718,979

10 Claims. (Cl. 117—54)

The instant invention relates to an improved method of making artificially colored granules and relates principally to the provision of artificially colored roofing granules intended for use in the decoration and protection of asphalt roofing, siding, etc.

It has been the practice in the manufacture of roofing material to embed roofing granules into the bitumuinous coating of the roofing material. These granules have consisted of minerals such as slate, stone trap rock, argillite, greystone, greenstone, quart, quartzite, etc. or of synthetic materials such as certain ceramic compositions. These granules have been coated with finely divided pigments in an inorganic bond, such a bond preferably being water-insoluble and highly adherent to the base granule. In carrying out these processes the base granule is coated with a pigment and a soluble silicate or the equivalent until a continuous coating is provided and the soluble silicate or equivalent is insolubilized by one or a combination of methods. One method involves insolubilizing at a low temperature by means of a "pickle" process in which either calcium or magnesium chloride or aluminum sulfate is used to insolubilize a soluble alkali silicate. In accordance with another method, such as is disclosed in the Jewett Patent No. 2,378,927, a soluble silicate and an insolubilizing agent such as clay, feldspar, cryolite, aluminum fluoride, or the like, are heated at elevated temperature to form in situ inter se an insoluble coating on a granule, typically a roofing granule. Numerous embodiments of this concept have been proffered, some dealing with the order of addition of coating components, others with the ratio of pigment to alkali silicate. Likewise hydrated alumina, titania and other pigments have been suggested as components of such composited granules.

In the preparation of coated granules in which an alkali silicate or other alkaline inorganic bonding agent is insolubilized in situ by reaction with an insolubilizing agent, particularly an insolubilizing pigment such as clay, the reaction is carried out below the fusion point of the alkali silicate or of the silicate-pigment system when an opaque coating is desired. Such opacity is frequently desired for aesthetic reasons and to inhibit the deleterious effect on the bituminous substrate of transmitted radiation. Accordingly, during the desired reaction the pigment disseminated on the granular substrate becomes bonded thereto by the insolubilization of the inorganic alkaline bonding agent. The granular base is selected to withstand the requisite elevated temperatures.

In the provision of opaque coated granules by the mode above-outlined, a problem is to achieve a continuous film of the requisite opacity. Although the pigment inorganic bonding agent coating is uniformly applied to the base granule, nevertheless, after insolubilization of the bonding agent there is a strong tendency for the insolubilized coating to segregate and become discontinuous whereby the opacity of the granule is seriously reduced and the adherence to bituminous or asphaltic bases impaired. This problem does not exist to the same extent when the reactants are fused and the ultimate coating is vitreous. Although the problem exists when any pigment is used to opacify the granule, it is particularly difficult to achieve a continuously coated granule in which clay, particularly kaolin clay, is the opacifying pigment. One expedient for improving the continuity of a fritted alkali silicate-clay coating has been to apply an alkali silicate solution to the base granule previously coated with finely divided clay and other pigments as desired, thereby to improve the distribution of the silicate and to facilitate its presence on the exterior of the coating. As a result, sealing of the exterior of the coating is improved. Another method involves intermixing the alkali sililate in dry particulate form with the clay and other pigments prior to distribution of these solids on the surface of the granular base. Thereafter water is added, and, at a suitably elevated temperature, the alkali silicate is insolubilized. The use of such methods, however, frequently falls short of providing the ultimate film continuity that is desired.

The suggestion has also been made in the prior art to apply the liquid alkali silicate to the granular base prior to coating with the powdered solids, thereby to improve retention of the powdered solids to the base before firing. However, the ultimate coating of the granule is not uniform because of the tendency of the silicate to gel prior to the time when its function as a bonding agent has been achieved.

Accordingly, it is a principal object of the invention to provide a method for providing an essentially insoluble granule opacified by a pigmentary coating which is bonded to the granular base by an inorganic bond, said coating being characterized by improved continuity. Another object of the invention is to provide a method for pretreating a granule adapted to receive a pigmentary coating which is subsequently bonded to the granule by an inorganic bond, the pretreatment being of such a character that the bonded coating is more continuous than it would be in the absence of the pretreatment. A more specific object of the invention is the provision of an insoluble opaque granule coated with a pigment, the pigment being bonded to the granule by reaction in situ between clay and a soluble silicate, the resultant pigmented coating having improved distribution on the granule surface by virtue of a novel pretreatment of the granule which neither interferes with the insolubilizing action of the clay on the alkali silicate nor otherwise adversely affects the performance, or appearance of the finished granules. Still another object of my invention is the provision of an insoluble opaque granule coated with a pigment comprising clay, the clay being bonded to the granule by reaction in situ between a portion of said clay and a soluble silicate, so that the ultimate product comprises a granule having clay disseminated on its surface and bonded thereto by reaction in situ inter se between an additional quantity of clay and an alkali silicate.

With these objects in view, I render a substantially insoluble granular base material amenable to retention of an insolubilized inorganic bonded pigmentary coating by treating that granular base material with a wetting agent of a character to be described hereinafter prior to application thereto of the pigment, inorganic bonding agent and insolubilizing agent. In accordance with the novel method of my invention, the pigment, insolubilizing agent and inorganic bonding agent may be applied to the granular base pretreated with wetting agent in any desired order, although for reasons hereinafter to be brought out, the soluble silicate is preferably applied after the pretreated granule is coated with the insolubilizing agent. In a preferred embodiment of my invention an alkali silicate bonding agent is insolubilized at a temperature sufficient to effect reaction between said silicate and metallic constituents of a comminuted additive without fusing the pigment particles disseminated on the surface of the granule. Maximum benefits will be realized when said reaction is carried out at a temperature level insufficient to vitrify the coating.

More specifically, the granular base material which I employ may be of natural or synthetic origin and is usually siliceous in nature and may be transluscent or opaque, the latter being preferred when it is available. Suitable granular bases are provided by silica bonded quartzite, trap rock (or other igneous rock which can endure without fracture the firing temperature to which the coated granule is subjected), crushed brick, porcelain, terra cotta, ceramic wastes, slag and slate. The granules, when used in roofing, will ordinarily be crushed to a particle size which will pass through a No. 10 mesh screen and be retained on a No. 35 mesh. However, it will be understood that wide variations in the particle size of the granular base may be permitted without departing from the spirit of the invention, particularly since coated granules outside of the preferred particle size range are useful as coloring bodies in artificial stone or the like.

The granular base and a wetting agent therefor are admixed prior to application of the opacifying coating to the base, this step preferably being carried in the presence of sufficient water to assure the relatively uniform distribution of a small quantity of said wetting agent on the surface granules. The wetting agent is one that is water soluble and may be non-ionic, anionic or cationic, with the exception that when the granular base is siliceous cationic wetting agents will ordinarily not be suitable. In general, it may be said that nonionic wetting or surface-active agents will be preferred although certain anionic surface-active agents may produce equally satisfactory results. I find that only a very small amount of wetting agent need be added to the granular base to achieve an ultimate coating of the requisite continuity. In general from about 0.0001% up to about 5.0%, and particularly 0.0001% to 0.1% will achieve satisfactory results. To distribute the wetting agent on the surface of the granular base and to effect the desired association of the components of the coating composition therewith, the wetting agent is applied in the form of a dilute solution, solutions of 0.1% to about 1.0% being examples of suitable dilutions. The amount of wetting agent is so small that during firing any fluxing effect of the wetting agent or carbonization of the wetting agent is not deleterious. In the latter case the small carbonaceous deposit which may result during firing of the granules will be obscured by the pigment deposited thereover.

Suitable nonionic wetting agents include the reaction products of fatty alcohols or alkyl-substituted phenols with an excess of ethylene oxide, and having formulas such as $RO(CH_2CH_2O)_nH$. Such compounds are polyoxyalkylene ethers and are typified by the compound $p\text{-}C_8H_{17}\text{—}C_6H_4(OCH_2CH_2)_nOH$ (sold under the trademark of Triton X-100), and compounds of the formula $RC_6H_4O(CH_2CH_2O)_nH$, wherein R is an alkyl group (sold as Igepals). Other useful nonionic wetting agents include the reaction product of oleyl alcohol with 15 moles of ethylene oxide and the analogous product using stearyl alcohol. Another useful group of nonionic wetting agents is the polyethylene oxide esters, prepared by condensing ethylene oxide with carboxylic acids such as fatty acids, rosin acids and tall oil; species include the urea complex of polyethylene glycol ester of mixed fatty and resin acids, polyethylene glycol ester of tall oil acids and polyethylene esters of fatty acids or rosin acids, such as the Ethofats. Other suitably non-ionic wetting agents include the fatty acid esters of sorbitans and fatty acid esters of sorbitans to which polyethylene ether chains have been attached by reaction with ethylene oxide. Useful nonionic agents include also nitrogen containing compounds, such as Ethomids which are fatty acid amides with two polyoxyethylene chains as substituents on the nitrogen atom. Anionic agents include alkyl aryl sulfonates derived particularly from benzene, naphthalene and usually available as complex mixtures. Representative species include sodium dodecyl benzenesulfonate, produced as Nacconol NR, and sodium decyl benzenesulfonate sold as Santomerse D. Another useful class of anionic agents is the sulfated fatty alcohols which are sodium salts of the monoesters of sulfuric acid with n-aliphatic alcohols containing 8–18 carbon atoms and having the general formula $CH_3(CH_2)_nOSO_3Na$. The principal alcohols used in their manufacture include oleyl alcohol and reduced coconut oil. Another important group of anionic agents is the esters of sodium sulfosuccinic acid, prepared by esterifying maleic acid with alcohols having 4 to 8 carbon atoms and adding sodium bisulfite to the resultant unsaturated ester; the bis-(2-ethyhexyl) ester is sold under the trademark Aerosol OT.

An inorganic bonding agent, preferably a soluble alkali silicate, is applied to the base granule either after the clay or other reactive insolubilizing agent has been applied to the granule or is intimately admixed in the dry state with other comminuted additives prior to coating the granular base material with the commingled particulated solids. The alkali silicate reacts with the metallic ions of the clay or other reactible to form in situ inter se calcium and/or aluminum sodium silicate complexes which set up into hardened masses. Sodium silicates are available commercially within a wide range of $Na_2O$ to $SiO_2$ ratios. For the purposes of my invention, I have found a particularly useful sodium silicate to be one in the ratio of $Na_2O$ to $SiO_2$ is about 1 to 1.322, such a product being known as "N brand." However, other alkaline alkali silicates may be used with good result, sodium silicate having a $Na_2O$ to $SiO_2$ ratio of 1 to 2 being an example of such a highly alkaline silicate. The optimum $Na_2O\text{—}SiO_2$ ratio will depend on the reactivity of the clay and/or other reactibles. The use of more alkaline silicates is indicated with clays of low reactivity. Water may be introduced to the clay-alkali silicate coating system at any point prior to firing when necessary to assure homogeneity of the components of the coating composition, although when sufficient water has been introduced into the granule as a vehicle for the wetting agent additional quantities of water may be omitted. I find that the alkali silicate in liquid form is preferably added to the granules coated with the necessary comminuted solids since optimum insolubilization is thereby accomplished.

The alkali silicate insolubilizing material which I employ is a metallic oxide or mixture of metallic oxides in which the metallic substituent is calcium, magnesium, aluminum or mixtures thereof or a metallic oxide in combination with an aluminiferous material capable of insolubilizing the alkali silicate by chemical reaction therewith, such aluminiferous materials including aluminum silicates, sodium alumina silicate and sodium aluminum fluoride (cryolite).

Of the various insolubilizing agents which I employ in finely divided form I prefer clay, preferably a kaolinitic clay. By kaolinitic clay I mean a hydrous aluminum silicate of the approximate formula $Al_2O_3 \cdot nSiO_2 \cdot 2H_2O$, wherein the weight ratio of $SiO_2$ to $Al_2O_3$ is within the range of 1 to 1.5 and more usually is 1.17; species of kaolinitic clays include kaolinite, halloysite, nacrite and dickite. The clay may be used as is, or, when whiteness of the coating is a factor, may be calcined at an elevated temperature to enhance the whiteness of the clay. Other clays such as certain bentonites may be used in lieu of or as partial replacement for the kaolin clay.

I may use various inorganic pigments in the preparation of the coated granules, such pigments being stable at the firing temperatures employed. In accordance with a preferred embodiment of my invention, clay in excess of that required to react with the alkali silicate or the like may be coated on the granule whereby the unreacted clay is disseminated on the surface of the granule and pigments the same. The excess clay reacts in situ with the alkali silicate to form an insoluble inorganic bond which affixes the residual clay pigment to the surface of the granule. Other pigments may be used alone or in conjunction with the clay to provide a color-bearing coating. Titania or hydrated alumina, particularly alphaalumina tri-hydrate may be included in the coating to contribute to whiteness. Other extenders which may be used include zinc oxide, talc, calcium carbonate, calcium silicate and diatomaceous earth. Pigments may be admixed to produce a coating of the desired color when fired, typical useful pigments including red iron oxide, ultramarine blue or cobalt blue, chrome oxide, carbon black, etc. If desired the pigments may be dispersed in the sodium silicate solution and be applied to the granule in that state although preferably they are commingled with other comminuted solids and applied to the granule prior to adding the alkali silicate thereto.

The granules, pretreated with the surface-active agent and coated with the pigment, clay and/or other reactable metallic oxide and alkali silicate, are calcined to effect insolubilization of said alkali silicate. Calcination may be preceded by a drying step if desired, although I may calcine the coated granules omitting the drying step. Suitable calcination temperatures ordinarily lie within the range of 450° F. to 1200° F. and preferably from about 650° F. to 1200° F. and particularly 900° F. to 1000° F. At temperatures below about 650° F. the insolubilization of the binder may be inadequate whereas above about 1200° F. deleterious fusion of the opacifying pigments may take place. Calcination is suitably accomplished in a rotary kiln.

The following examples are given only for the sake of more fully illustrating my invention and are not to be construed as limiting the scope thereof.

*Example I*

White roofing granules were prepared using a calcined kaolin clay as the pigment, the clay being coated on the granule in an amount in excess of that required to react with sodium silicate. A nonionic wetting agent of the alkyl aryl polyether type, Triton X-102, was precoated on granular base prior to application of the pigmentary coating thereto. The composition of the granules was as follows:

| | Parts by weight |
|---|---|
| Wrentham granules | 600 |
| Satintone No. 1[1] | 40 |
| 0.1% Triton X-102 in water | 34 |
| "N" brand sodium silicate | 30 |

[1] Calcined kaolin clay.

In the preparation of the pigmented granules, 17.0 parts by weight of the Triton solution was shaken with the granules for a minute in a container whereafter the additional solution was added to the granules and shaking continued for another minute. The clay was then added to the treated granules and shaken for two minutes to accumulate a deposit on the granule surface. Sodium silicate was then added and the container shaken on a jar mill for 15 minutes. The coated granules were calcined for 10 minutes at a temperature within the range of from 860° F. to 930° F. The resultant granules were coated with a continuous smooth white film. In the absence of the pretreatment with the wetting agent a comparable formulation displays inferior film continuity.

*Example II*

A formulation for a white granule of excellent film continuity is:

| | Parts by weight |
|---|---|
| Granules | 600 |
| Sodium decyl benzenesulfonate, 0.05% solution | 26 |
| Kaolin clay | 11.5 |
| $TiO_2$ | 9.2 |
| "N" brand sodium silicate | 18.4 |
| Water | 1.2 |

The granules are prewetted with the wetting agent and the solids added thereto. The sodium silicate dissolved in the water is then applied and the granules thus coated and fired at 850° F.

I claim:

1. In a process for coating a siliceous mineral granule with clay particles to produce an opaque water-insoluble coating thereon comprising disseminating on the surface of said granule sodium silicate and clay in excess of that reactable with said sodium silicate, and firing said granule at a temperature below that at which said clay fuses thereby to insolubilize said sodium silicate, the improvement consisting essentially of: applying to the surface of said mineral granule a compound selected from the group consisting of water-soluble anionic wetting agents and water-soluble nonionic wetting agents, prior to disseminating said clay and said sodium silicate on the surface of said granule.

2. The process of claim 1 in which said wetting agent is anionic.

3. The process of claim 1 in which said wetting agent is nonionic.

4. The process of claim 1 in which said wetting agent is an ester of sodium sulfosuccinic acid.

5. The process of claim 1 in which said wetting agent is a polyoxyalkylene ether.

6. The process of claim 1 in which said wetting agent is an alkyl aryl sulfonate.

7. The process of claim 1 in which said wetting agent is a sulfated fatty alcohol.

8. The process of claim 1 in which said wetting agent is a polyethylene oxide ester.

9. A process for coating a mineral granule with clay particles to produce an opaque water-insoluble coating thereon which comprises applying to the surface of a mineral base granule a dilute aqueous solution of a material selected from the group consisting of water-soluble anionic wetting agents and water-soluble nonionic wetting agents, thereafter disseminating a pigment comprising clay on the surface of said granule, adding sodium silicate in amount sufficient to react with only a portion of said clay, and firing said granule at a temperature below that at which said pigment fuses so as to insolubilize said sodium silicate.

10. The method of claim 9 in which said clay is kaolin clay.

References Cited in the file of this patent

UNITED STATES PATENTS

| 1,802,127 | Teague | Apr. 21, 1931 |
| 2,378,927 | Jewett | June 26, 1945 |
| 2,379,358 | Jewett | June 26, 1945 |
| 2,553,604 | Pole | May 22, 1951 |